P. A. KENNEDY.
DENTAL ARTICULATOR.
APPLICATION FILED JULY 7, 1910.

981,430.

Patented Jan. 10, 1911.

WITNESSES
W. P. Burke
L. Najek

INVENTOR
Patrick Alfred Kennedy
BY Wm Warran White
ATTY.

UNITED STATES PATENT OFFICE.

PATRICK ALFRED KENNEDY, OF REDFERN, NEAR SYDNEY, NEW SOUTH WALES, AUSTRALIA.

DENTAL ARTICULATOR.

981,430.

Specification of Letters Patent.  Patented Jan. 10, 1911.

Application filed July 7, 1910. Serial No. 570,809.

*To all whom it may concern:*

Be it known that I, PATRICK ALFRED KENNEDY, a subject of the King of Great Britain and Ireland, residing at 16 Castlereagh street, Redfern, near Sydney, in the State of New South Wales, Australia, have invented certain new and useful Improvements in Dental Articulators, of which the following is a specification.

My invention relates to apparatus for carrying molds for artificial dentures in proper articulated relation during the making of the dentures.

According to my invention the plaster molds are clamped to the articulator pans by attachments which permit of ready adjustment in any direction. The form of articulator in which this adjustment is effected includes certain other improvements in connection with the hinge, which is made with a ball joint fitting by which manipulation of the molds while clamped in the pans is facilitated.

Figure 1:
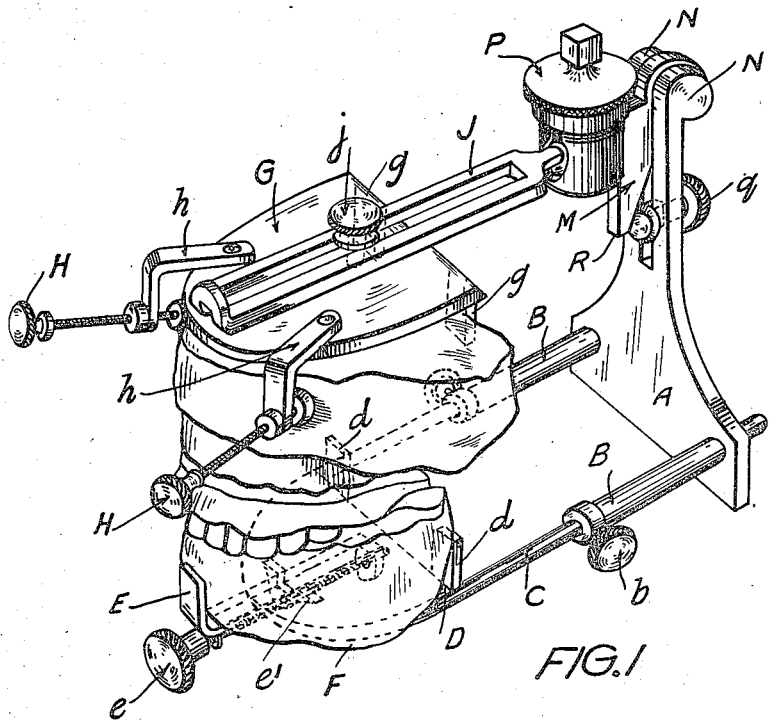
Figure 2:
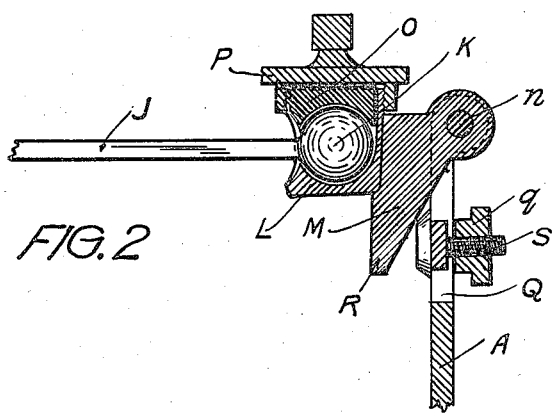

Figure 1 is a perspective view of a dental articulator according to the present invention, and Fig. 2 an enlarged fragment section through the articulator ball joint hinge.

A is the back plate having at the bottom two tubular carriers B with pinching screws *b*. Through these tubular carriers the rods C, which carry the lower pan D slide telescopically. The pan D is fitted with two fixed lugs *d* and a movable lug E the stem of which (shown in dotted lines) is slidable lengthwise of the pan D. This lug is under control of the screw *e* which works through the bridge piece *e'* fixed below the pan.

F is the lower mold clamped to the pan D by the lugs *d* and E.

The upper pan G is provided with two fixed lugs *g* and two pinching screws H which work through brackets *h* riveted to the pan or formed integral with it. This pan G is carried on a slotted bar J to which it is secured by the thumb nut *j*. The bar J is formed with a spherical head K on its rear end; this head fits into a hemispherical cup L on the wing M, said wing being secured in the jaws N of the back plate A by a free pin *n*. A hemispherical cap O is provided to take against the upper side of the head K and this cap is acted upon by the hollow cover nut P which is provided with a knurled flange and a key stem. The depth adjuster by which the molds are prevented from being brought too closely together, consists of a chamfered head bolt S which is set in the slot Q in the back plate A by a thumb nut *q*. The heel R of the wing M takes against the edge of the head of this bolt.

The mode of using the articulator is as follows:—Impressions are taken of the upper and lower jaw of the patient by pressing warmed wax or like plastic substance into the same, and these impressions are used as molds in which plaster casts are made. The "bite" is obtained by closing the patient's jaws on a piece of like plastic material. The two casts are now set in proper register by placing the bite gage so formed between them, and while they are held together in register they are clamped in the articulator pans by means of the screws H H and *e e*. The position of the casts relatively to the articulation point *n* is set by sliding the rods C telescopically through the tubes B and by moving the upper pan G along the slotted bar J, the parts being finally secured by means of the set pins *b* and *j*. It may be necessary to readjust either or both of the casts after the jaw length adjustment has been made as described, in order that the bite will be precisely correct. Transverse adjustment is effected by means of the ball and cup joint which is set after adjustment by screwing down the cap P. The bolt S is now moved in the slot Q until it takes against the rear face R of the hinge wing M, and it is then set by means of the nut *q*. The casts may now be moved apart about the pin *n* and the bite gage removed; when they are brought into juxtaposition, the register will be correct and dentures fitted therewith will therefore correctly fit the mouth of the patient. The plaster molds may be removed by retiring the screws H H and *e e*.

What I claim as my invention and desire to secure by Letters Patent is:—

1. In a dental articulator, the combination of a back plate, a mold pan supported thereon by a telescopic carrier and fitted with clamps for securing a plaster mold in said pan a hinge on the back plate, a mold pan fitted with clamps for securing a plaster mold therein, a slotted bar for carrying said mold pan, and a ball joint with clamping device connecting said extensible bar to said hinge.

2. In a dental articulator, the combination of back frame A, telescopic carriers B C for a mold pan D, a mold clamping device on said pan, a hinge leaf M articulated at $n$ to the frame A, a depth gage slidable on the frame A and taking against the angular back R of said hinge leaf, a ball joint and clamp, a slotted bar mold carrier J, a mold pan G, a screw $j$ for securing the said pan G on the carrier J, and mold clamping device on the pan G.

3. In a dental articulator, the combination of a back plate, a lower mold pan mounted telescopically on the lower part of said back plate, screw clamps for securing the mold to said pan, an upper pan similarly fitted with mold screw clamps, an arm carrying said upper mold pan, a pinching screw for securing said upper pan to said arm, and a ball-joint provided with a tightening screw connecting said arm with a hinge leaf articulated to the upper part of the back plate.

4. In a dental articulator, the combination with a lower mold pan, of an upper mold pan and an arm for supporting it, a ball-joint at the end of said arm, and adjustable fastening means operatively associated with said upper pan and said arm for permitting sliding and rotational movement of the said pan relatively to the said arm.

5. In a dental articulator, the combination with a back plate, of mold pan carriers one of which is fixed to the back plate and the other of which is articulated thereto through a ball-joint, an angular leaf M on said ball-joint forming articulation to the back plates, and an adjustable stop slidable in a slot in the back plate taking against the rear side of said leaf.

In testimony whereof I have affixed my signature in presence of two witnesses.

PATRICK ALFRED KENNEDY.

Witnesses:
W. I. DAVIS,
M. J. CANDRICK.